United States Patent [19]
Das

[11] Patent Number: 5,081,554
[45] Date of Patent: Jan. 14, 1992

[54] BIASING CONDUCTOR FOR MR HEAD

[75] Inventor: Shyam C. Das, Sudbury, Mass.

[73] Assignee: Digital Equipment Corporation, Maynard, Mass.

[21] Appl. No.: 534,371

[22] Filed: Jun. 6, 1990

Related U.S. Application Data

[63] Continuation of Ser. No. 370,049, Jun. 22, 1989, abandoned, which is a continuation-in-part of Ser. No. 253,390, Oct. 4, 1988, Pat. No. 4,885,649, which is a continuation of Ser. No. 33,466, Apr. 1, 1987, abandoned.

[51] Int. Cl.$^5$ .................. G11B 5/17; G11B 5/31; G11B 5/39
[52] U.S. Cl. .................. 360/113; 360/123; 360/126
[58] Field of Search ............... 360/113, 123, 126, 127; 338/32 R; 324/252

[56] References Cited

U.S. PATENT DOCUMENTS

| | | | |
|---|---|---|---|
| 4,103,315 | 7/1978 | Hempstead et al. | 360/110 |
| 4,317,148 | 2/1982 | Chi | 360/119 |
| 4,356,523 | 10/1982 | Yeh | 360/113 |
| 4,413,296 | 11/1983 | Jeffers | 360/113 |
| 4,425,593 | 1/1984 | Postma | 360/113 |
| 4,566,050 | 1/1986 | Beam et al. | 360/113 |
| 4,626,946 | 12/1986 | Vinal | 360/113 |
| 4,639,811 | 1/1987 | Diepers et al. | 360/125 |
| 4,649,447 | 3/1987 | Huang et al. | 360/113 |
| 4,675,766 | 6/1987 | Schewe | 360/123 |
| 4,698,711 | 10/1987 | Vinal | 360/113 |
| 4,816,947 | 3/1989 | Vinal et al. | 360/113 |
| 4,885,649 | 12/1989 | Das | 360/113 |
| 4,891,725 | 1/1990 | Mowry | 360/113 |
| 4,907,113 | 3/1990 | Mallary | 360/112 |
| 4,935,832 | 5/1990 | Das et al. | 360/112 |

FOREIGN PATENT DOCUMENTS 0154005 9/1985 European Pat. Off. .
WO88/07741 3/1988 PCT Int'l Appl. .

OTHER PUBLICATIONS

Jeffers, "Magnetoresistive Transducer With Canted Easy Axis", IEEE Transactions on Magnetics, vol. Mag-15, No. 6, Nov. 1979, pp. 1628-1629.

Potter, "Self-Consistent Computer Calculations For Perpendicular Magnetic Recording", IEEE Transactions on Magnetics, vol. Mag-16, No. 5, Sep. 1980, pp. 967-972.

Mallary et al., "Frequency Response Of Thin-Film Heads With Longitudinal And Transverse Anisotropy", IEEE Transactions on Magnetics, vol. 26, No. 5, Sep. 1990, pp. 1334-1336.

Primary Examiner—Robert S. Tupper
Attorney, Agent, or Firm—Fish & Richardson

[57] ABSTRACT

A combined transverse and longitudinal biasing conductor for MR element, and a thin film head including same.

24 Claims, 4 Drawing Sheets

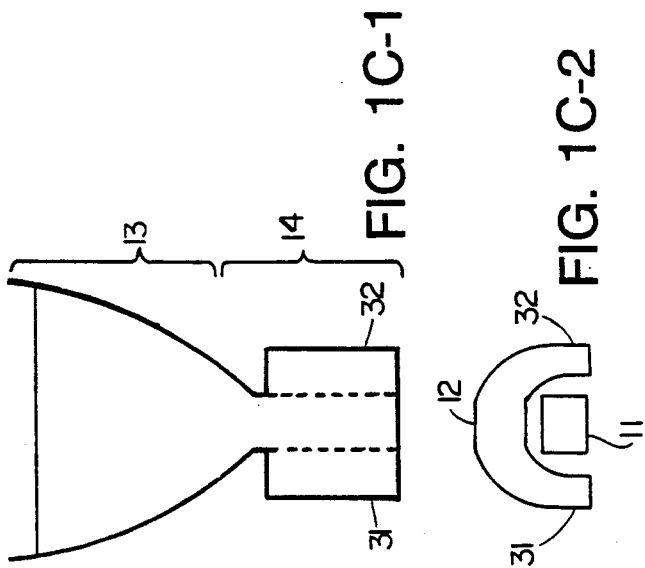
FIG. 1C-1
FIG. 1C-2
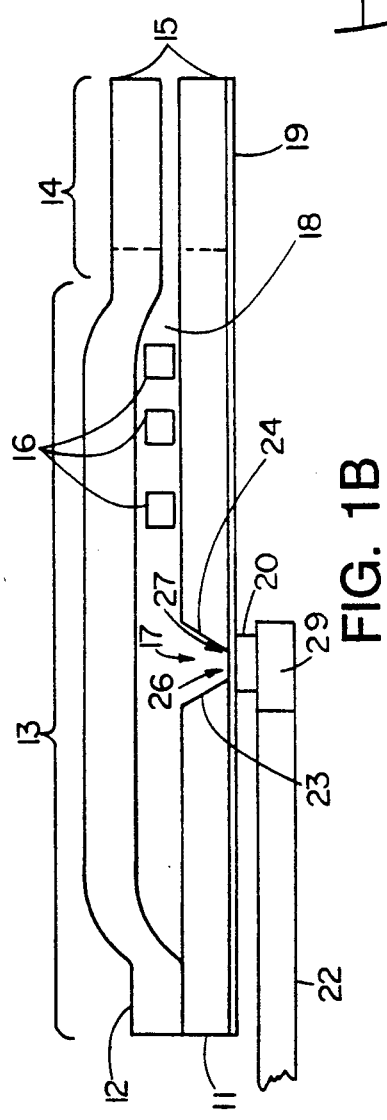
FIG. 1B
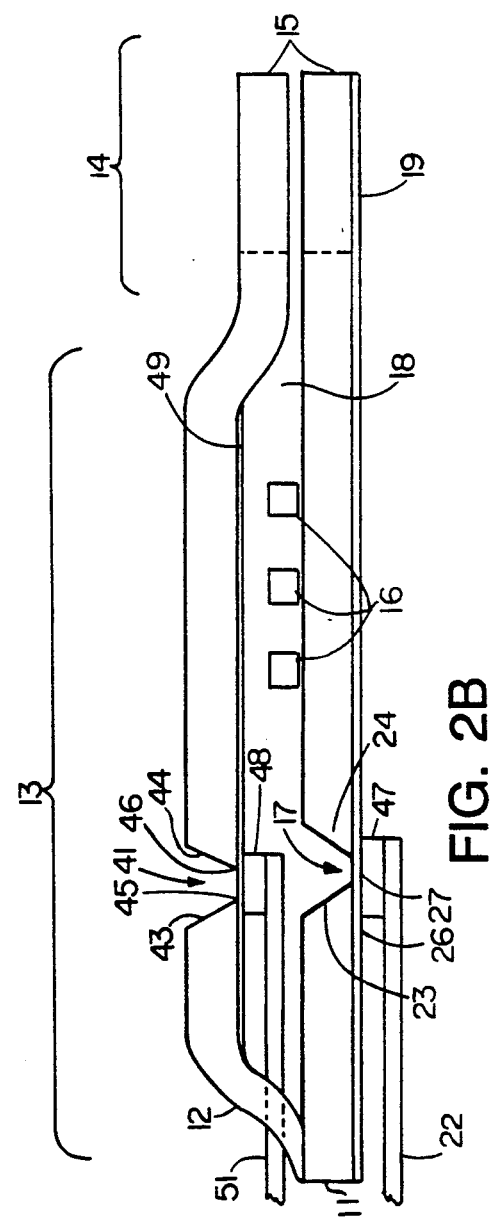
FIG. 2B

BIASING CONDUCTOR FOR MR HEAD

This is a continuation of co-pending U.S. Pat. application Ser. No. 07/370,049 filed on June 22, 1989 now abandoned which is a continuation-in-part of U.S. Pat. Ser. No. 07/253,390 filed Oct. 4, 1988 now U.S. Pat. No. 4,885,649 which is a continuation of U.S. Pat. Ser. No.. 07/033,466 filed Apr. 1, 1987 now abandoned.

BACKGROUND OF THE INVENTION

1. Field of the Invention

The invention relates generally to the field of magnetic data storage devices, and particularly to read/write heads for use in such devices. The invention particularly provides a new magneto-resistive (i.e., MR) thin film head for use in disk data storage devices for sue in digital data processing systems.

2. Description of the Prior Art

A typical modern digital data processing system comprises a hierarchy of memory devices, including a semiconductor main memory of relatively small capacity, and one or more mass storage devices, which have a much greater capacity than the main memory, but which are also relatively much slower. The mass storage devices provide a back-up store for data which is in the main memory, and also for the voluminous amounts of data which will not fit into the main memory, but which can be called upon by the processor when it is needed. A processor typically only obtains information directly from the main memory, and so, when it needs information which at the moment is only in a mass storage device, it enables the mass storage device to copy the information into the main memory. Some time later, after it has processed the information, the processor enables the processed information to be stored in the mass storage device. This frees up storage in the main memory so that other information may be stored there.

Typical mass storage devices store information on spinning magnetic disks, the information being recorded in the form of transitions in magnetic flux on the magnetic surface of the disk. In particular, the data is recorded in a plurality of tracks, with each track being a selected radial distance from the center of the disk. A read/write head flies in close proximity to the disk surface and is held in the appropriate radial position over the disk by an arm. Under the control of the system's processor unit the arm can move the read/write head to the appropriate track in which the data is recorded so that it may be read, or into which the data is to be written.

A read/write head comprises two pole pieces formed from a magnetic material and a wire coil. At one end, the pole pieces are touching and at the other end there is a slight gap between the pole pieces. The head is positioned so that the gap is directed towards the disk surface. When electric current is impressed on the coil, a magnetic flux is generated, which is impressed upon the pole pieces. At the gap, the magnetic flux is directed through the magnetic material in the adjacent disk surface to thereby impress magnetic flux therein.

When data is being written onto a disk, the coil is energized with a varying voltage pattern which corresponds to the data to be written. The varying voltage results in the generation of a corresponding pattern in the magnetic flux which the head applies to the surface of the rotating disk. Since the disk moves relative to the head, the magnetic flux on the disk surface also varies along the length of the arc traversed by the head on the disk.

When the data is read, the head flies over the arc of the disk surface in which the data was written. A small amount of flux from the disk permeates the head. The flux in the head varies in response to the pattern of flux recorded on the disk. The varying flux results in the generation of a varying voltage in the coil, which, in turn, is sensed as the previously-recorded data.

One problem with a conventional read/write head is that the variation in the voltage induced in the coil does not directly follow the actual flux, but instead follows the rate of change of the flux as the disk rotates adjacent the head. It is therefore evident that reading of data with conventional heads is sensitive to the speed of the disk relative to the head, that is, the speed of rotation of the disk.

Recently, read/write heads have been developed which include a strip of magneto-resistive material, such as a nickel iron alloy. One such alloy is commercially known as "Permalloy". The strip is positioned in the gap between the pole pieces that are adjacent the disk. In such heads, the electrical resistance of the magneto-resistive material is related to an applied magnetic field. As flux from the disk permeate the head while it flies over the disk surface, the flux is applied to the magneto-resistive material. Thus, the resistance of the magneto-resistive material varies in response to the variations in the flux in the head, which in turn reflects the variations in the flux on the disk. The resistance of the magneto-resistive strip is sensed by conventional sensing circuits to provide a signal that is related to the recorded flux. Thus, unlike the conventional read/write heads, the voltage signals from such read/write heads, specifically from the magneto-resistive strip, are not sensitive to the speed of the disk.

In a head having a magneto-resistive strip, the strip is formed so as to have a magnetization along the length of the strip; that is, the magnetic dipoles in the strip are aligned parallel to the strip's longitudinal axis. A current is applied longitudinally to the strip. A graph of the resistance of the strip to electric current, in relation to the direction of the strip's magnetic dipoles, is a bell-shaped curve. For example, if the strip is a nickel iron alloy, if no external flux is applied to the head, the resistance exhibited by the strip to current applied in a longitudinal direction through the strip (which is parallel to the magnetization) will be at a maximum. If, however, external magnetic flux is applied to the strip which forces the strip's magnetic dipoles into an orientation perpendicular to the length of the strip, the strip's resistance to the applied current will be at a minimum.

Otherwise stated, continuing with the same example, if the current flow is parallel to the magnetization of the strip, the resistance of the strip is at a maximum, but if the current flow is orthogonal to the magnetization, the resistance is at a minimum. Intermediate these two extremes, that is, with the strip's magnetic dipoles aligned approximately forty-five degrees with the direction of the applied current, the change in resistance of the strip with respect to the applied magnetic field is approximately linear. It will be appreciated that the alignment of the strip's magnetic dipoles is related to the applied magnetic flux, and thus the resistance of the strip will be related to the direction and amount of applied magnetic flux.

There are two problems with heads using magneto-resistive strips as read elements. One problem is that the magneto-resistive strip requires external biasing to force it into the linear region so that the resistance changes as an approximately linear function of the applied flux. If a magneto-resistive strip is not biased, a small applied flux from a disk will be unable to change the orientation of the strip's magnetic dipoles sufficiently to provide a large enough change in the resistance of the strip. The same will occur if the strip is biased too much, so that the magnetic dipoles are perpendicular to the strip's longitudinal direction. In either case, the strip will have a very low sensitivity to the applied flux level.

U.S. Pat. No. 4,535,375, issued to G. Mowry, et al., on Aug. 13, 1985, entitled Magnetoresistive Head, discloses a head with a complex magneto-resistive read element. The magneto-resistive element disclosed in that patent includes an elongated magneto-resistive strip and plurality of equipotential strips disposed along the element at a skewed angle (generally, approximately forty-five degrees) with respect to the element's longitudinal axis. A bias current is applied and the equipotential strips force the current to flow generally orthogonal to the strips. The magneto-resistive strip's magnetic dipoles are at a forty-five degree angle with respect to the current.

Another problem with magneto-resistive elements is a result of the tendency of an element, which was originally magnetized in a single magnetic domain (that is, a region in which all of the magnetic dipoles are oriented in a common direction), to develop a plurality of separate magnetic domains. One cause of formation of multiple domains is end effects, that is the perturbation of the dipoles at the ends of the strip, which are usually not precisely aligned with the longitudinal axis because of spreading typical at the end of a magnetic member. Over time, the effect may spread throughout the strip, resulting in multiple magnetic domains throughout the strip.

Another source of multiple domains in magneto-resistive strips arises from the fact that, during writing, the head, including the magneto-resistive strip, is saturated with magnetic flux (hereafter "write flux"). This write flux is perpendicular to the longitudinal direction of the strip, and the magnetic dipoles in the strip tend to align with the applied write flux. After the write operation is completed, the strip's magnetic dipoles return to an orientation along the strip's longitudinal axis, but they need not return to their former orientations. They may instead be aligned in the opposite direction. As this repeatedly occurs following write operations, a number of domains develop with differing orientations of magnetic dipoles. Thus, multiple domains may be created throughout the strips, not just at the ends.

A result of the development of the multiple magnetic domains is Barkhausen noise, which is noise in the voltage signal due to sudden jumps in the magnetization of the strip. The magneto-resistive element disclosed in the aforementioned U.S. Pat. No. 4,535,375 proposes to minimize Barkhausen noise by providing a very long magneto-resistive strip and sensing the change in resistivity across only a small portion of its length. This can help with minimizing the Barkhausen noise due to end effects, but it does not significantly reduce the noise due to the creation of multiple domains along the strip caused by the write flux applied to the strip. Furthermore, the length of the magneto-resistive element disclosed in the patent and the placement of the element adjacent the disk in the pole tip combine to effectively limit the inter-track spacing, as the tracks must be far enough apart so that, while the element is positioned over one track, it does not receive interfering flux from an adjacent track.

SUMMARY OF THE INVENTION

In one aspect of the present invention a thin film head is provided with at least one active pole extending from a yoke region and terminating in a pole tip for cooperation with a magnetic medium to provide a flux circuit between the yoke and medium, and an MR element adjacent to the active pole so that flux from the medium carried by the active pole from its tip toward the yoke region can be sensed by the MR element, and a combined transverse and longitudinal biasing conductor adjacent to the MR element for supplying transverse and/or longitudinal bias to the MR element.

Embodiments of this aspect may include any of the following features: the biasing conductor may include a conductor with a center conductive section extending into a plurality of conductive leads, a first pair of the leads forming a circuit in conjunction with the center section for transverse bias, and a second pair of the leads forming a circuit in conjunction with the center section for longitudinal bias, whereby the conductor is capable of supplying transverse and longitudinal bias to the MR element. The conductor may extend into at least four leads comprising the first and second pairs of leads. The MR element may have two leads which terminate at edges located within the local width of the active pole to define the active region of the MR element. The center section may extend along the longitudinal axis, its length along the axis being greater than its width transverse to the axis.

Each lead of the second pair of leads may extend outward, respectively, from opposing sides of the center section transverse to the axis. Each lead of the first pair of leads may extend outward, respectively, from opposing sides of the center section transverse to the axis. Each lead of the first pair of leads may terminate, respectively, at first and second contact pads and each lead of the second pair of leads may terminate, respectively, at third and fourth contact pads. The MR element may have at least two leads, a first MR element lead terminating at the first or second contact pad and a second MR element lead terminating at a fifth contact pad. The head may further include a write coil adjacent to the active pole, a first coil lead terminating at the first or second contact pad and a second coil lead terminating at the third or fourth contact pad.

Alternatively, the first and second leads may terminate at first and second contact pads and the third and fourth leads terminate at third and fourth contact pads, the MR element having at least two leads, a first MR element lead terminating at the first or second contact pad and a second MR element lead terminating at the third or fourth contact pad. The head may further include a write coil adjacent to the active pole, a first coil lead terminating at the first, second, third, or fourth contact pad, and a second coil lead terminating at a fifth contact pad. The MR element and the conductor are preferably electrically separated by an isolation layer.

In another aspect of the invention an electrical conductor capable of providing transverse and/or longitudinal magnetic bias to an MR element of a magnetic head includes a conductor with an enlarged center conductive section extending along a longitudinal axis and having a first pair of conductive leads extending essentially from the respective ends of the center section and a second pair of leads extending effectively transversely from the center section, the first pair of leads being excitable in conjunction with the center section, and capable of providing a transverse bias field to the MR element longitudinally aligned with said axis, and the second pair of leads being longitudinally excitable in conjunction with the center section and capable of providing in a longitudinal bias field to the MR element.

Embodiments of this aspect may include any of the following features: The center section length along the axis may be greater than its width transverse to the axis. Each lead of the second pair of leads may extend outward, respectively, from opposing sides of the center section transverse to the axis in a single layer of a multilayer device. Each lead of the first pair of leads may extend outward, respectively, from opposing sides of the center section at least partially along the axis in a single layer of a multilayer device.

Other aspects features and advantages of the present invention are set forth below and in the claims.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 1A depicts a top view of a new read/write head constructed in accordance with the invention and FIG. 1B depicts a cross-sectional view of the head depicted in FIG. 1A taken along axis X—X;

FIGS. 1C-1 and 1C-2 depict a front and end detail view, respectively of an alternate pole tip for the head depicted in FIG. 1A; and FIG. 2A depicts a top view of a second read/write head constructed in accordance with the invention and FIG. 2B depicts a cross-sectional view of the head depicted in FIG. 2A.

DETAILED DESCRIPTION OF AN ILLUSTRATIVE EMBODIMENT

Figure 1A:
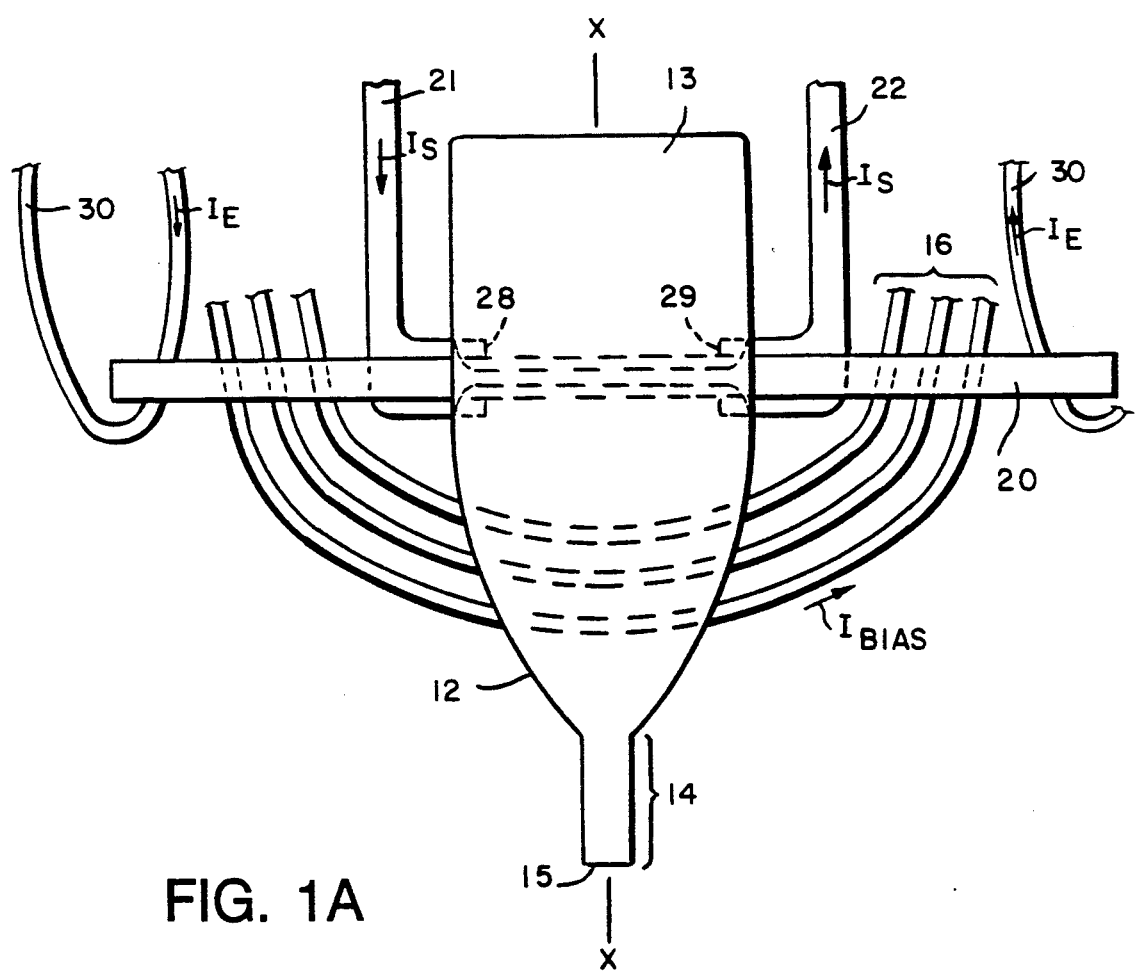

With reference to FIGS. 1A and 1B, a new read/write head 10 constructed in accordance with the invention includes two pole pieces 11 and 12 formed of a magnetic material separated by a layer 18 of insulation such as a hard-baked photoresist. Each pole piece defines a relatively large yoke region 13 which tapers to a pole tip 14 having an end 15. In operation, the head is suspended from an arm (not shown) so that the end 15 is generally directed toward the surface of a spinning disk (not shown) which has a magnetic media thereon, and the far end of the yoke region 13 (to the left as shown in FIG. 1B) will be distal from the disk surface. The head has a axis indicated by the legend X-X, and the arm holds the head so that the axis X-X is generally orthogonal to the disk surface.

Head 10 also includes a multiple-turn planar helical coil 16 (a portion of which is depicted in FIG. 1A) positioned between the pole pieces 11 and 12 in the yoke region to generate magnetic flux for writing data onto the disk as described below. At the left end of the yoke region 13, the pole pieces 11 and 12 touch so as to encircle a portion of the coil to provide a complete path of magnetic material between the pole pieces in the yoke region 13. Otherwise, a separation is maintained between the pole pieces in both the yoke region 13 and the pole tip 14. In the yoke region, the separation between the pole pieces 11 and 12 may be relatively large, to allow the pole pieces to accommodate the coil 16 and ensure that there is minimal flux leakage between the pole pieces. In the pole tip, however, the separation between the pole pieces is relatively small.

In accordance with one aspect of the invention, a slot 17 is formed in yoke region 13 of one pole piece in an orientation which is generally parallel to the expected orientation of the disk surface. That is, the orientation of the slot 17 is generally orthogonal to axis X-X. In the embodiment depicted in FIG. 1, the lot is formed in pole piece 11 Adjacent the slot, a strip 20 of magneto-resistive material, such as a nickel iron alloy (such as "Permalloy"), is positioned, electrically insulated from the pole piece 11 by a thin, non-magnetic insulator such as alumina or silicon dioxide. The strip is formed so as to have a single magnetic domain with its magnetic dipoles situated parallel to the strip's longitudinal axis, that is perpendicular to the axis X-X. The ends of the magneto-resistive strip 20 are connected to electrodes 21 and 22 which are also connected to sensing circuits (not shown) whose operation will be described below. Preferably the walls 23 and 24 defining slot 17 are not disposed orthogonally to strip 20, but instead are slanted at an acute angle with respect to the strip 20 so as to form pointed edges 26 and 27 adjacent the strip 20, as is shown in FIG. 1B.

As described above, the coil 16 is used during a writing operation, in which magnetic signals representing digital data are impressed in the magnetic media comprising the disk surface. During a Writing operation, an electrical signal representing the digital data is applied to the coil 16. The electrical signal applied to coil 16 varies to define the digital data to be recorded in a known manner. In response to the electrical signal, the coil generates magnetic flux in the pole pieces. Assuming that, at one instance, the electrical signal is conditioned to enable the coil to generate magnetic flux upwardly (as shown in FIG. 1B) and forwardly (as shown in the FIG. 1A), that is, in the direction toward pole piece 12, the magnetic flux is first received in pole piece 12 in the yoke region 13. The flux travels in pole piece 12 through the yoke region toward the pole tip. Because the pole tip has a smaller cross-sectional area than the yoke region, the flux is concentrated in the gap; that is, the amount of flux per unit area in the gap is greater than in the yoke region. At the end 15 of pole piece 12, the flux exits the pole piece and goes through the magnetic surface of the disk thereby impressing the magnetic flux in the magnetic media that is then adjacent the gap.

The flux returns from the disk through end 15 of pole piece 11. From there, it goes through the pole tip of pole piece 11 to the pole piece's yoke region. The larger yoke region permits the flux to spread out. At slot 17, the pointed edge 26 adjacent the magneto-resistive strip 20 concentrates the flux and directs it through the strip 20, which conducts it to edge 27. Edge 27 receives the flux from magneto-resistive strip 20 and directs it to the distal end of the yoke region 13 of pole piece 11. Since the flux during a write operation is generally very large, the magneto-resistive strip essentially saturates and largely acts as an air gap across the slot 17.

It will also be appreciated that, if at some instances the magnetic flux generated by coil 16 has the opposite direction from that described above, the path of the flux through the pole pieces and disk's magnetic media is also reversed. Thus, the pole pieces 11 and 12, the disk magnetic media and strip 20 form a complete magnetic circuit for the flux generated by coil 16 during a writing operation. In addition, with the disk spinning under the head, the arm (not shown) maintaining the head over one track on the disk, the varying magnetic flux generated by head 10 in response to the variations in the digital data is applied to the magnetic media along the track. Accordingly, the flux changes representative of the digital data are impressed along the track on the disk.

In accordance with another aspect of the invention, while, or immediately after, the data is written, a current $I_E$ is applied to wires 30 positioned underneath the ends of the magneto-resistive strip 20. The current applied to the wires 30 establishes a small magnetic field in the magneto-resistive strip 20, which enables the magnetic dipoles in the strip, which during the writing operation had been in an orientation parallel to the axis X-X (that is, orthogonal to the longitudinal axis of the strip 20) to orient themselves in one direction along the longitudinal axis. In effect, the write flux through the magneto-resistive strip 20 forces the strip's dipoles in an orientation orthogonal to the longitudinal direction. When the write flux is removed, the dipoles may return to a longitudinal orientation, but in either direction. The magnetic field applied by the wires 30 enables the dipoles to return to a selected direction, which is determined by the field generated by the wires. Accordingly, the wires 30, and application of current thereto after the writing operation, maintain the magneto-resistive strip in a single magnetic domain.

After data has been written, it may be read by positioning the read/write head 10 over the disk track on which the data has been written. During a reading operation, a constant current bias is applied to the coil 16. As a result of this current, a constant magnetic flux is generated, which is applied to the pole pieces 11 and 12 and, accordingly, to magneto-resistive strip 20. This flux is a bias flux in the magneto-resistive strip 20. The current which generates the reference flux is high enough to generate sufficient flux to be used as a biasing flux, but is small enough that the flux does not interfere with the data which has been recorded on the disk.

As the disk moves adjacent the end 15, the transitions in the flux recorded on the disk provides magnetic flu which permeates the pole pieces 11 and 12 through the end 15 of the pole tip 14. The magneto-resistive strip 20 essentially senses the flux in the pole piece 11 in which it is situated. The flux permeating the other pole piece 12 has little effect on strip 20. It will be appreciated that the edges 26 and 27 in pole piece 11, which are defined by the respective walls 23 and 24 positioned at acute angles, ensure that the flux is efficiently conducted to and through the magneto-resistive strip 20 and to reduce fringing edge effects of the magnetic flux at the walls 23 and 24 which might cause at least some of the flux to bypass some or all of magneto-resistive strip 20.

Sensing equipment (not shown) applies a current $I_S$ between the electrodes 21 and 22, and detects changes in the voltage due to the field from the transitions. The changes in the voltage sensed by the sensing equipment are directly related to the changes in resistance of the magneto-resistive strip 20, and specifically the changes in the resistance of the portion of the strip between end faces 28 and 29 of the electrodes 21 and 22. Thus, as the disk passes under end 15 of head 10, the changes in the voltage level, relative to the voltage level resulting from only the bias flux from coil 16, are directly related to the changes in the resistance of the magneto-resistive material, and, accordingly, the change in the flux pattern on the disk.

It will be appreciated that two factors limit the density with which data can be recorded on the disk, namely, the number of tracks which can be recorded per unit of radius of the disk, and the number of flux transitions which may be recorded per length of track. The number of tracks per unit of radius is, in turn, related to the width of the pole pieces 11 and 12 at the end 15. Thus, the wider the pole pieces at end 15, the fewer the number of tracks which may be recorded per unit of radius.

The number of flux transitions which may be recorded per length of track is related to several factors, including the width of the gap, that is, the distance between pole pieces at end 15. It will be appreciated that the larger the gap width, the less data may be recorded on a track.

The arrangement depicted in the FIGS. 1A and 1B permits both the width of the pole pieces at end 15 and the gap width to be minimized, thus enhancing the density of data which may be recorded, while using a magneto-resistive strip 20 of sufficient length to minimize the effects of the Barkhausen noise due to creation of multiple magnetic domains at the ends of the magneto-resistive strip 20. In prior heads in which the magneto-resistive strip was placed in the gap, the gap had to be of greater width to accommodate the strip. In addition, in the head described in the aforementioned U.S. Pat. No. 4,535,375, the head is relatively long to minimize the Barkhausen noise, but the length is constrained by the desired track density.

By removing the magneto-resistive strip 20 from the pole tip 14 and placing it in the yoke region 13, both the width of the pole pieces and the width of the gap at end 15 may be made smaller. Since the width of the pole pieces in the yoke region 13 is much larger than width in the pole tip, the magneto-resistive strip 20 may be made longer, thus minimizing the Barkhausen noise due to end effects. The coil wires 30 further reduce Barkhausen noise in the other portions of the strip 20 by urging the magnetic dipoles in a common direction following writing operations.

In addition, since the width of the pole pieces 11 and 12 in the yoke region 13 of the new read/write head is independent of the track density, the length of the magneto-resistive strip between the ends 28 and 29 of the electrodes 21 and 22 is also independent of the track density, the sensitivity during reading is also independent of the track density. If the portion of the magneto-resistive strip 20 between the sensing electrodes 21 and 22 is short, as is the case when the strip is in the gap in the pole tip region, the resistance of the strip and the change in resistance during reading are both low, and so the sensitivity of the strip is also low. However, since the strip 20 in the new head is in the yoke region 13, the portion of the strip between the electrodes 21 and 22 is relatively long, permitting a higher sensitivity. Since the width of the yoke is independent of the track density the sensitivity of the new head is also independent of the track density, except for the effect of the higher reluctance of the tapering pole tips.

FIG. 1C-1 and 1C-2 depict a detail of a modification of the pole tip region 14 to provide side shields 31 and 32. The side shields 31 and 32 are attached to and form part of the pole tip portion 14 of pole piece 12, and depend along the side of the pole tip portion 14 of pole piece 11. The side shields 31 and 32 may be formed from the same magnetic material comprising the pole pieces 11 and 12.

In operation, the side shields 31 and 32 shield the pole tip portion 14 of pole piece 11 from fringing flux from adjacent tracks during a reading operation. The fringing flux from adjacent tracks can permeate the pole piece in the same manner as flux from the track the head 10 is reading and can result in noise in the signal obtained by the sensing equipment (not shown) that is connected to the head. Since, as described above, the output from the magneto-resistive strip 20 relates to the magnetic flux permeating pole piece 11, and is substantially unrelated to the flux permeating pole piece 12, with the side shields 31 and 32 the magneto-resistive strip is not effected by the fringing flux from the adjacent tracks. Thus, by shielding the head from the fringing flux, the side shields 31 and 32 can improve the signal-to-noise ratio and permit closer spacing between tracks.

In an alternative embodiment of the invention, the write coil 16 is independent of the MR biasing circuit, while transverse and longitudinal biasing are both provided by a single bias conductor. A preferred star-shaped bias conductor 60 is shown in the exploded view of FIG. 3, having a first pair of leads 62, 64, and a second pair of leads 66, 68, all four of which physically intersect at center region 70. Leads 62, 64 cooperate to provide a longitudinal bias conductor and leads 66, 68 cooperate to provide a transverse bias conductor. Hence, a multifunction field coupling bias conductor can be formed in a single manufacturing stage which can provide both transverse and longitudinal bias to the MR element when coupled to appropriate transverse and longitudinal bias sources 72, 74, respectively.

Figure 3:
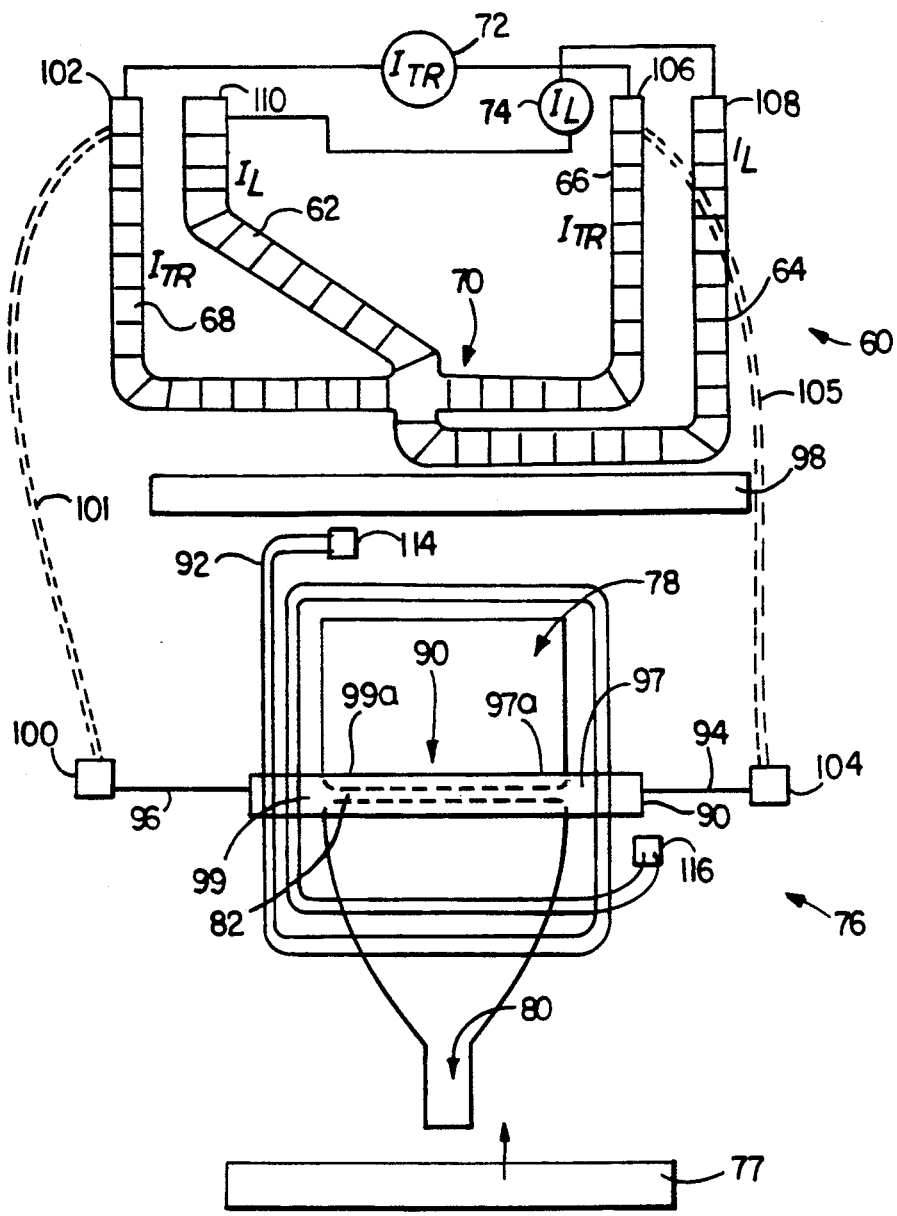
FIG. 3 is an exploded view of one embodiment of the present biasing conductor invention.

FIG. 3 also shows one pole of a thin film head 76, having a yoke region 78 and a pole tip region 80, with a slot 82 in yoke region 78. The MR element 90 is located adjacent the slot. In this example, head 76 is also provided with a write coil 92.

MR element 90 is provided with a pair of conductors, 94, 96, one at each end thereof, which are in turn coupled to a sensing circuit (not shown) for supplying of sense current and for reading of flux sensed by the element from medium 77. Star conductor 60 is formed in proximity to and over (or under) the MR element, field coupled thereto, but electrically isolated therefrom by an electrical isolation layer 98.

In an alternative embodiment, conductor 60 is not electrically isolated from MR element 90, but rather is of different resistance so that current distribution can be approximately adjusted. For example, this can be accomplished with a low resistance conductor 60 and a higher resistance MR element 90. As a result, the same leads can be used for the conductor and the MR element. This facilitates elimination of the isolation layer 98 and reduction of the number of leads and pads.

In operation, whether monopole, two pole, three pole, or greater, write coil 92 is energized to enable head 76 to write information onto medium 77, the flux flowing through pole 76 to the medium and returning via a pole and yoke section back to pole 76. The write flux from coil 92 will also impinge upon and perturb the single domain structure of MR element 90. It is desirable, therefore, at the conclusion of writing, that longitudinal bias source 74 be pulsed on and off. As a result, current will flow from source 74, through lead 62, across center region 70, and will return to source 74 via lead 64. This bias will be applied at such a level as to drive MR element 90 into its preferred single domain orientation prior to reading. As well, it should be noted that the longitudinal bias supplied via leads 62, 64 will have no influence on the read mode because it is switched off before reading.

After the longitudinal bias source 74 is switched off, and with the MR element in a single domain state, source 72 can be switched on to supply transverse bias to the MR element to assure linear operation, the bias current flowing from source 72, through lead 68, across center region 70 and returning to source 72 via lead 66.

A benefit of the foregoing embodiment includes being able to apply the longitudinal and transverse bias directly to the active region of the MR element. Also, it is easier and less expensive to fabricate a single conductor to take the place of two separate conductors or of other biasing techniques. Furthermore, the star conductor can provide heat sinking capability to lead heat away from the MR element. As well, the star conductor acts as a planarizing layer under the MR element, which can reduce process complexity. This planarization results in lowered probability of Barkhausen noise and increased sensitivity.

In the above embodiment, the six leads 62, 64, 66, 68, 94 and 96, each terminate at a respective contact pad, 110, 108, 106, 102, 104 and 100. In an alternative embodiment, these six leads can be terminated at four contact pads. In this case, the electrical isolation layer 98 between the MR element 90 and the star conductor 60 is eliminated such that the MR element leads 94, 96 and transverse bias leads 66, 68, respectively, overlap and can be combined. Hence, leads 66, 94 can be terminated at a combined contact pad 104, 106 (see jumper 105 in dotted outline) and leads 68, 96 can terminate at a combined contact pad 100, 102 (see jumper 101 in dotted outline). The longitudinal bias conductor still is provided with separate contact pads 108, 110.

Furthermore, in an embodiment which includes coil 92, one additional pad is required if coil pads 114 or 116 are made coincident with pads 106 or 110.

In the configuration where the isolation layer 98 is omitted, the MR element can be made of NiFe and the bias conductor 60 of a lower or higher resistivity metal. In this case, during reading, a transverse bias field is supplied to the MR element 90 via jumpered pads 102 and 106, leads 68, 66, and center 70 of conductor 60, with the proportion of current flowing through the MR element and conductor being determined by the relative resistivity of the element and conductor. Flux from medium 77 is sensed by the MR element and is read at jumpered pads 102 and 106 via MR leads 96, 94.

It should also be appreciated that leads 94 and 96 are applied to MR element 90, for example, by means of a deposited low resistance film 97, 99. The films terminate at an edge 97a, 99a, respectively, where the edges are defined within the local width of pole 76. The active region of the MR element is therefore defined between edges 97a, 99a.

Alternative embodiments may include combining sources 72, 74 using appropriate switching circuits to operate the appropriate longitudinal or transverse legs.

It will be appreciated that in manufacture of the embodiments described above, that the jumper in reality need not be a separate component since electrically combined leads can be made as one. The jumpering concept has been used herein merely for ease of explanation.

Figure 4:
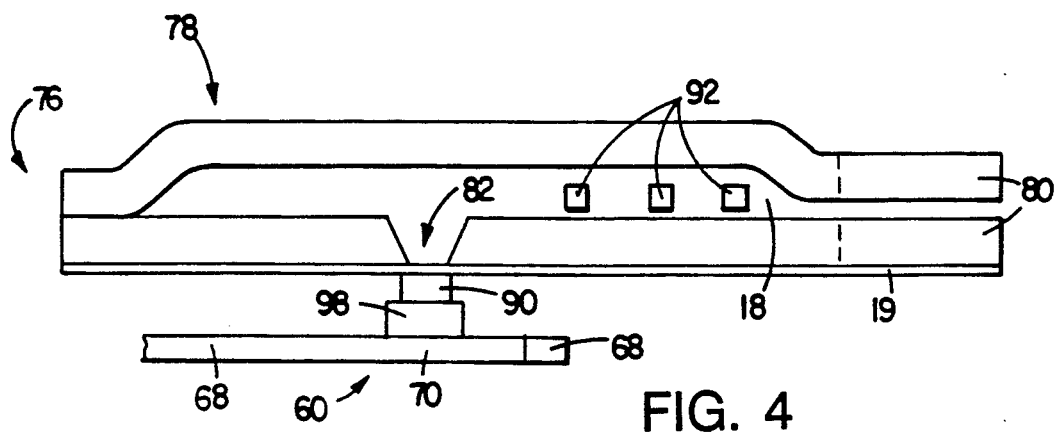
FIG. 4 is a side cross-sectional view of the embodiment of FIG. 3 used in the head of FIG. 1B.

Refer also to FIG. 4, which shows a portion of star conductor 60 in use with a magnetic head like that shown in FIG. 1B and discussed above. (The reference numerals of FIG. 3 have been used, except for insulation layers 18 and 19. Also, for clarity electrode 22 and its end face 29 have been omitted.) As discussed above, star conductor 60 is disposed under MR strip 90, and MR strip 90 is field coupled to star conductor 60 (i.e., coupled to the field generatied as a result of current flow in star conductor 60). Layer 98 electrically isolates MR strip 90 from star conductor 60.

Figure 2A:
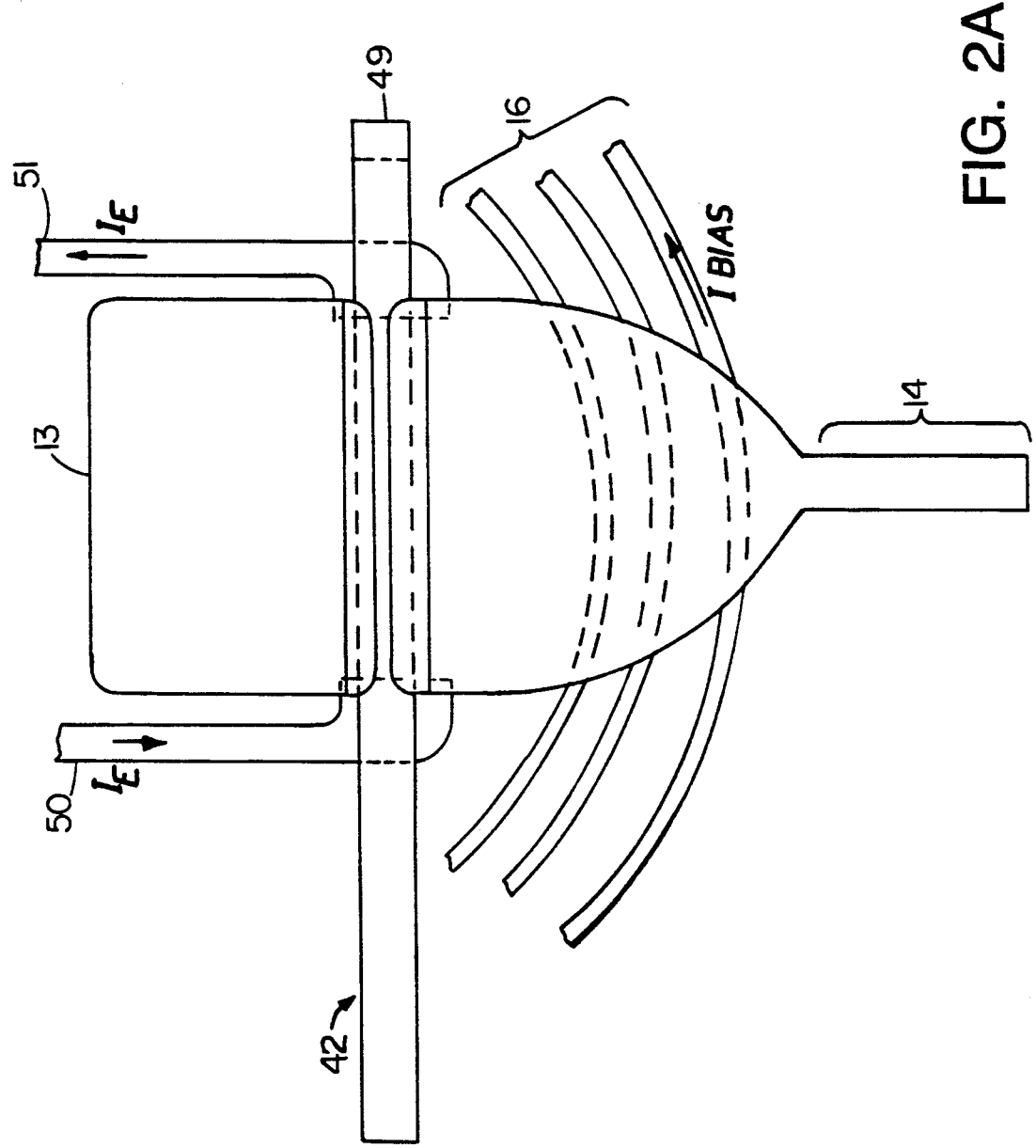

FIG. 2A and 2B depicts another read/write head 40 which is similar to head 10 of FIG. 1A and 1B, with the addition of a slot 41 in the yoke region 13 of pole piece 12 and the positioning of a portion of a magneto-resistive strip 42 therein, separated from pole piece 12 by an insulating layer 49, which is similar to insulating layer 19. Elements of head 40 which are similar to the elements of head 10 have common reference numerals. Like slot 17, slot 41 includes surfaces 43 and 44 situated at acute angles with respect to the pole piece 12 so as to form edges 45 and 46 adjacent the strip 42. Strip 42 is generally in the shape of a U, with portions 47 and 48 being adjacent the slots 17 and 41, respectively, and a connecting portion 49 connecting the portions 47 and 48. Electrodes 21 and 22 are positioned adjacent to, and in electrical contact with portion 47 of strip 42, and a second pair of electrodes 50 and 51 is positioned adjacent to and in electrical contact with portion 48. If the head 40 is formed using conventional thin-film techniques, the connecting portion 49 may be a via formed using conventional using conventional techniques.

The operation of read/write head 40 is similar to that of head 10, with the addition that, during a read operation, the flux permeating both pole pieces 11 and 12 will affect the resistance of strip 42, whereas with head 10 the resistance of strip 20 is affected primarily by the flux permeating the pole piece 11 adjacent the strip 20. Accordingly, the signal sensed by the sensing equipment (not shown) connected to electrodes 21, 22, 51 and 52 adjacent both pole pieces 11 and 12 of head 40 (FIG. 2A) would be more symmetric than would be the signal sensed by sensing equipment connected to electrodes 21 and 22 adjacent only one pole piece 11 of head 10 (FIG. 1A). A symmetric read signal is more readily processed by other circuitry (not shown) with which the head is used than is an asymmetric read signal.

Furthermore, with the strip 42 effectively long in the shape of a horseshoe magnet, the strip is more resistant to formation of multiple magnetic domains by externally applied magnetic flux which is present, in particular, during writing operations.

It will be appreciated by those skilled in the art that additional slots may be formed in the pole pieces to accommodate additional portions of a magneto-resistive strip. In such heads, a single magneto-resistive strip will be positioned, in a serpentine configuration, adjacent all of said slots. The longer magneto-resistive strip 20 will serve to further minimize the Barkhousen noise, and will also serve to increase the sensitivity of the head to the flux read from the disk.

It will also be appreciated that the particular placement of the magneto-resistive strips depicted in the Figures, that is, generally beneath the respective pole pieces 11 and 12, is by way of example and not of limitation. In particular, during some thin film manufacturing processes, it is desirable to form the magneto-resistive strips prior to formation of the adjacent pole pieces to ensure that the magneto-resistive strips are formed on a relatively planar surface. The particular side of the respective pole pieces on which the magneto-resistive strips are formed does not effect the operation of the respective heads 10 and 40.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A thin film head comprising
   at least one active pole extending from a yoke region and terminating in a pole tip for cooperation with a magnetic medium to provide a flux circuit between the yoke and the medium,
   a magneto-resistive element disposed along a longitudinal axis and is disposed adjacent to the active pole so that flux from the medium carried by the active pole from its tip toward the yoke region can be sensed by the magneto-resistive element, and
   a combined transverse and longitudinal biasing structure adapted to be energized in successive first and second modes of operation, said biasing structure including:
   a longitudinal bias portion disposed in proximity with the magneto-resistive element and configured to be energized in said first mode to cause at least some magnetic dipoles of said magneto-resistive element to become aligned along said longitudinal axis, thereby to provide said longitudinal bias, and
   a transverse bias portion connected to said longitudinal bias portion, disposed in proximity with the magneto-resistive element, and configured to be energized in said second mode to cause at least some of said magnetic dipoles of said magneto-resistive element to become oriented at an oblique angle relative to said longitudinal axis, thereby to provide said transverse bias.

2. The head of claim 1 wherein said biasing structure comprises:
   (a) a conductor with a center conductive section extending into a plurality of conductive leads,
   (b) a first pair of the leads forming said transverse bias portion in conjunction with the center section, and
   (c) a second pair of the leads forming said longitudinal bias portion in conjunction with the center section.

3. The head of claim 2 wherein the conductor extends into at least four leads comprising the first and second pairs of leads.

4. The head of claim 3 wherein the first and second leads terminate at first and second contact pads and the third and fourth leads terminate at third and fourth contact pads, the magneto-resistive element having at least two leads, a first magneto-resistive element lead terminating at the first or second contact pad and a second magneto-resistive element lead terminating at the third or fourth contact pad.

5. The head of claim 2 wherein the center section extends along said longitudinal axis, its length along the axis being greater than its width transverse to the axis.

6. The head of claim 5 wherein each lead of the second pair of leads extends outward, respectively, from opposing sides of the center section transverse to the axis.

7. The head of claim 5 wherein each lead of the first pair of leads extends outward, respectively, from opposing sides of the center section transverse to the axis.

8. The head of claim 2 wherein the magneto-resistive element and the conductor are electrically separated by an isolation layer.

9. The head of claim 8 wherein each lead of the first pair of leads terminates, respectively, at first and second contact pads and each lead of the second pair of leads terminates, respectively, at third and fourth contact pads.

10. The head of claim 9 wherein the magneto-resistive element has at least two leads, a first magneto-resistive element lead terminating at the first or second contact pad and a second magneto-resistive element lead terminating at a fifth contact pad.

11. The head of claim 10 further including a write coil adjacent to the active pole, a first coil lead terminating at the first or second contact pad and a second coil lead terminating at the third or fourth contact pad.

12. The head of claim 9 further including a write coil adjacent to the active pole, a first coil lead terminating at the first, second, third, or fourth contact pad, and a second coil lead terminating at a fifth contact pad.

13. The head of claim 1 wherein said active pole is constructed to read said flux from said medium, said biasing structure being adapted to operate in said second mode during reading of said flux.

14. The head of claim 13 further comprising a second pole coupled to said active pole in said yoke region, said second pole being constructed to write said flux on said medium, said writing of said flux causing at least some of said magnetic dipoles of said magneto-resistive element to become arranged transversely to said longitudinal axis, said biasing structure being adapted to operate in said first mode during said writing of said flux.

15. The head of claim 13 further comprising a second pole coupled to said active pole in said yoke region, said second pole being constructed to write said flux on said medium, said writing of said flux causing at least some of said magnetic dipoles of said magneto-resistive element to become arranged transversely to said longitudinal axis, said biasing structure being adapted to operate in said first mode after said writing of said flux and before flux is subsequently read by said active pole.

16. The head of claim 1 wherein the magneto-resistive element has two leads which terminate at edges located within the local width of the active pole to define the active region of the magneto-resistive element.

17. A combined transverse and longitudinal biasing structure for a magneto-resistive element disposed along a longitudinal axis in a magnetic head, said biasing structure comprising:
(a) a conductor disposed in proximity with said magneto-resistive element and having a center conductive section extending along said longitudinal axis, said conductor having a first pair of conductive leads connected to respective end regions of the center section and a second pair of conductive leads disposed transversely with respect to the center section,
(b) the first pair of leads being configured to be energized in conjunction with the center section to apply a transverse bias field to said magneto-resistive element, and
(c) the second pair of leads being configured to be energized in conjunction with the center section to apply a longitudinal bias field to said magneto-resistive element.

18. The structure of claim 17 wherein the center section length along the axis is greater than its width transverse to the axis.

19. The structure of claim 18 wherein each lead of the second pair of leads extends outward, respectively, from opposing sides of the center section transverse to the axis in a single layer of a multilayer device.

20. The structure of claim 18 wherein each lead of the first pair of leads extends outward, respectively, from opposing sides of the center section at leas partially along the axis in a single layer of a multilayer device.

21. A method of operating a thin film head that includes at least one active pole extending form a yoke region and terminating in a pole tip for cooperation with a magnetic medium to provide a flux circuit between the yoke and the medium, and a magneto-resistive element that extends along a longitudinal axis and is disposed adjacent to the active pole so that flux from the medium carried by the active pole from its tip toward the yoke region can be sensed by the magneto-resistive element, said method comprising
providing a combined transverse and longitudinal biasing structure adapted to be energized in successive first and second modes of operation,
energizing a first portion of said biasing structure disposed in proximity with the magneto-resistive element in said first mode to cause at least some magnetic dipoles of said magneto-resistive element to become aligned along said longitudinal axis, thereby to provide said longitudinal bias, and
energizing, in said second mode, a second portion of said biasing structure connected to said first portion and disposed in proximity with the magneto-resistive element to cause at least some of said magnetic dipoles of said magneto-resistive element to become oriented at an oblique angle relative to said longitudinal axis, thereby to provide said transverse bias.

22. The method of claim 21 wherein said active pole is constructed as a read pole, and further comprising
reading said flux from said medium with said read pole, and
operating said biasing structure in said second mode during said reading.

23. The method of claim 22 wherein said head further comprises a write pole coupled to said active pole in said yoke region, said method further comprising
writing said flux on said medium with said write pole, said writing causing at least some of said magnetic dipoles of said magneto-resistive element to become arranged transversely to said longitudinal axis, and
operating said biasing structure in said first mode during said writing.

24. The method of claim 22 wherein said head further comprises a write pole coupled to said active pole in said yoke region, said method further comprising
writing said flux on said medium with said write pole, said writing causing at least some of said magnetic dipoles of said magneto-resistive element to become arranged transversely to said longitudinal axis, and
operating said biasing structure in said first mode after said writing and before flux is subsequently read by said active pole.

* * * * *